United States Patent [19]
Kang

[11] Patent Number: 6,050,535
[45] Date of Patent: Apr. 18, 2000

[54] FLAT PANEL DISPLAY DEVICE HAVING A WIDE ADJUSTING RANGE OF A VISUAL ANGLE

[75] Inventor: Suk-io Kang, Seoul, Rep. of Korea

[73] Assignee: Samsung Electronics Co., Ltd., Suwon, Rep. of Korea

[21] Appl. No.: 09/222,826

[22] Filed: Dec. 30, 1998

[30] Foreign Application Priority Data

Dec. 31, 1997 [KR] Rep. of Korea ..................... 97-44774

[51] Int. Cl.[7] .............................. A47F 7/00; F16M 11/12
[52] U.S. Cl. ....................... 248/371; 248/415; 248/919; 248/923
[58] Field of Search .................................. 248/917, 918, 248/919, 920, 921, 922, 923, 924, 371, 415, 131, 133, 346.03, 349.1, 183.2, 398; 361/686; 345/903, 905

[56] References Cited

U.S. PATENT DOCUMENTS

| | | | |
|---|---|---|---|
| 4,304,385 | 12/1981 | Farouche et al. | 248/920 |
| 4,365,561 | 12/1982 | Tellier et al. | 248/920 |
| 4,591,120 | 5/1986 | Bryant-Jeffries et al. | 248/921 |
| 4,989,813 | 2/1991 | Kim et al. | 248/921 |
| 5,398,903 | 3/1995 | Cho | 248/921 |
| 5,518,216 | 5/1996 | Wu | 248/921 |
| 5,603,478 | 2/1997 | Wang | 248/923 |
| 5,687,944 | 11/1997 | Shon | 248/919 |
| 5,694,291 | 12/1997 | Feightner | 361/686 |
| 5,732,922 | 3/1998 | Jeon | 248/921 |
| 5,751,548 | 5/1998 | Hall et al. | 361/686 |
| 5,870,280 | 2/1999 | Cho | 248/921 |
| 5,904,328 | 5/1999 | Leveridge et al. | 248/919 |
| 5,923,528 | 7/1999 | Lee | 248/921 |
| 5,938,163 | 8/1999 | Gotham, Sr. et al. | 248/919 |
| 5,947,440 | 9/1999 | Cho | 248/919 |
| 5,971,268 | 10/1999 | Lynch et al. | 248/923 |

*Primary Examiner*—Ramon O. Ramirez
*Assistant Examiner*—Jon A Szumny
*Attorney, Agent, or Firm*—Staas & Halsey

[57] ABSTRACT

A flat panel display device that rotates smoothly in a horizontal direction and has a wide swiveling angle for easy adjustment of a visual angle. The flat panel display device includes a display unit that has a flat panel for displaying an image, and a stand to support the display unit, with a circular recess located at a top portion of the stand. A hinge member connects the display unit to the stand and includes a ring-shaped rotation member. The rotation member has a first portion and a second portion, with the second portion positioned below the first portion. The second portion has an inner diameter smaller than an inner diameter of the first portion, and two stoppers are positioned in the second portion. A holder is fixed to the circular recess of the stand to secure the rotation member within the stand. The holder includes two claws that are engaged to a bottom surface of the rotation member, and a protrusion member, formed at an outer circumference of the holder, to come in contact with the stoppers.

20 Claims, 6 Drawing Sheets

6,050,535

FLAT PANEL DISPLAY DEVICE HAVING A WIDE ADJUSTING RANGE OF A VISUAL ANGLE

CROSS-REFERENCE TO RELATED APPLICATIONS

This application makes reference to, incorporates the same herein, and claims all benefits accruing under 35 U.S.C. § 119 from my utility model application entitled Flat Panel Display Device filed with the Korean Industrial Property Office on Dec. 31, 1997 and duly assigned Serial No. 97-44774 by that Office.

BACKGROUND OF THE INVENTION

1. Field of the Invention

The present invention relates to a flat panel display device, and more particularly, the present invention relates to a flat panel display device having a wide adjusting range of a visual angle.

2. Description of the Related Art

As shown in FIG. 1, generally, a conventional flat panel display device includes a display unit 1 having a flat panel 2 for displaying an image, and a stand 3 for rotatably supporting the display unit 1. A hinge member 4 is positioned between the display unit 1 and the stand 3 so that the display unit 1 is pivotally supported by the stand 3 through the hinge member 4 to pivot about an axis, parallel to a surface on which the stand 3 rests, in a direction of arrow A, shown in FIG. 1. The display unit 1 can also be rotated, within a certain range, in a horizontal direction about an axis perpendicular to a surface on which the stand 3 rests, through the hinge member 4. The pivoting of the display unit 1 in the direction of arrow A is referred to as a tilting operation, and the rotation of the display unit 1 in the horizontal direction is referred to as a swiveling operation.

In the conventional flat panel display device, however, the hinge member 4 has a relatively narrow swiveling angle of approximately 30° to 40°, making it difficult to adjust a visual angle of the display unit 1 to a desirable position. In addition, the conventional display unit 1 cannot be rotated smoothly as a result of structural problems associated with the hinge member 4.

SUMMARY OF THE INVENTION

Accordingly, it is an object of the present invention to provide a flat panel display device with smooth rotation in a horizontal direction and a wide swiveling angle that enables easy adjustment of a visual angle.

Additional objects and advantages of the invention will be set forth in part in the description which follows and, in part, will be obvious from the description, or may be learned by practice of the invention.

The above and other objects of the present invention can be attained by a flat panel display device that includes a display unit that has a flat panel to display an image, a stand to support the display unit, and a hinge member. The hinge member includes a ring-shaped rotation member rotatably secured within a circular recess of the stand. The rotation member has a first portion and a second portion, with the second portion positioned below the first portion and having stoppers and an inner diameter that is less than an inner diameter of the first portion. A holder is fixed to the circular recess of the stand to secure the rotation member within the stand. A protrusion member is formed along an outer circumference of the holder to come in contact with the stoppers, and downward extending claws of the holder are engaged with a bottom surface of the rotation member.

The hinge member also includes a rotating bracket assembly that is fixed to the display unit and pivots about a tilting shaft fixed to the rotation member. The circular recess of the stand has a plurality of thruholes positioned within the inner diameter of the second portion of the rotation member, and the holder has a plurality of bosses formed at a lower surface of the holder corresponding to the thruholes.

The stoppers are positioned at a front portion of the rotation member, and the protrusion member of the holder is positioned at a rear portion of the rotation member when the holder is engaged with the rotation member. The holder has holes formed at the lower portion of the holder. Two pins are located along the circular recess of the stand. Each pin is positioned between the thruholes and functions as a reference position to fix the holder to the stand, and the pins are inserted within the holes of the holder.

In the preferred embodiment of the present invention, an angle between the stoppers is approximately 240°.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF PREFERRED EMBODIMENT

Figure 1:
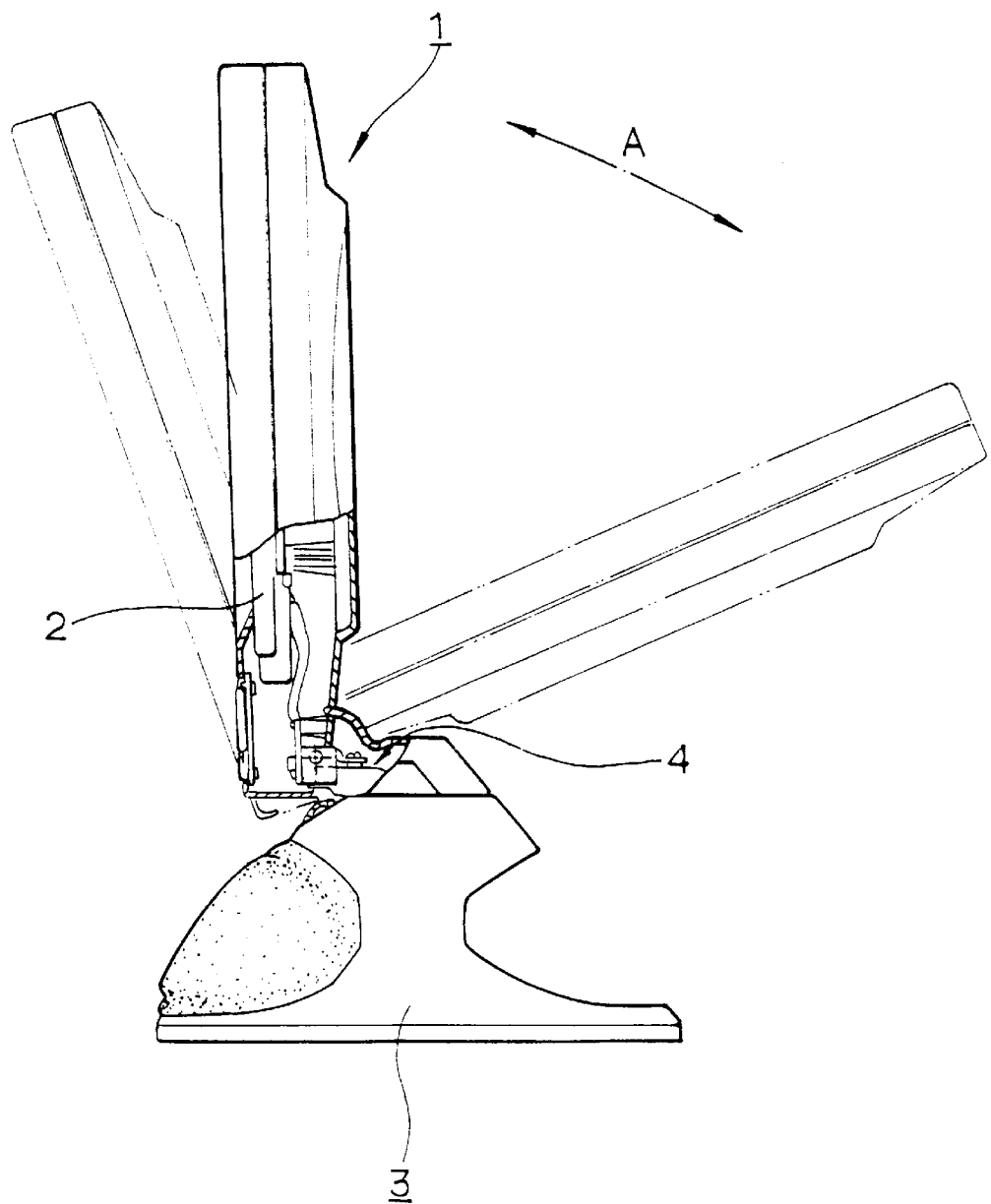
FIG. 1 is a side view of a flat panel display device, including a hinge connecting part, according to the conventional art.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Figure 2:
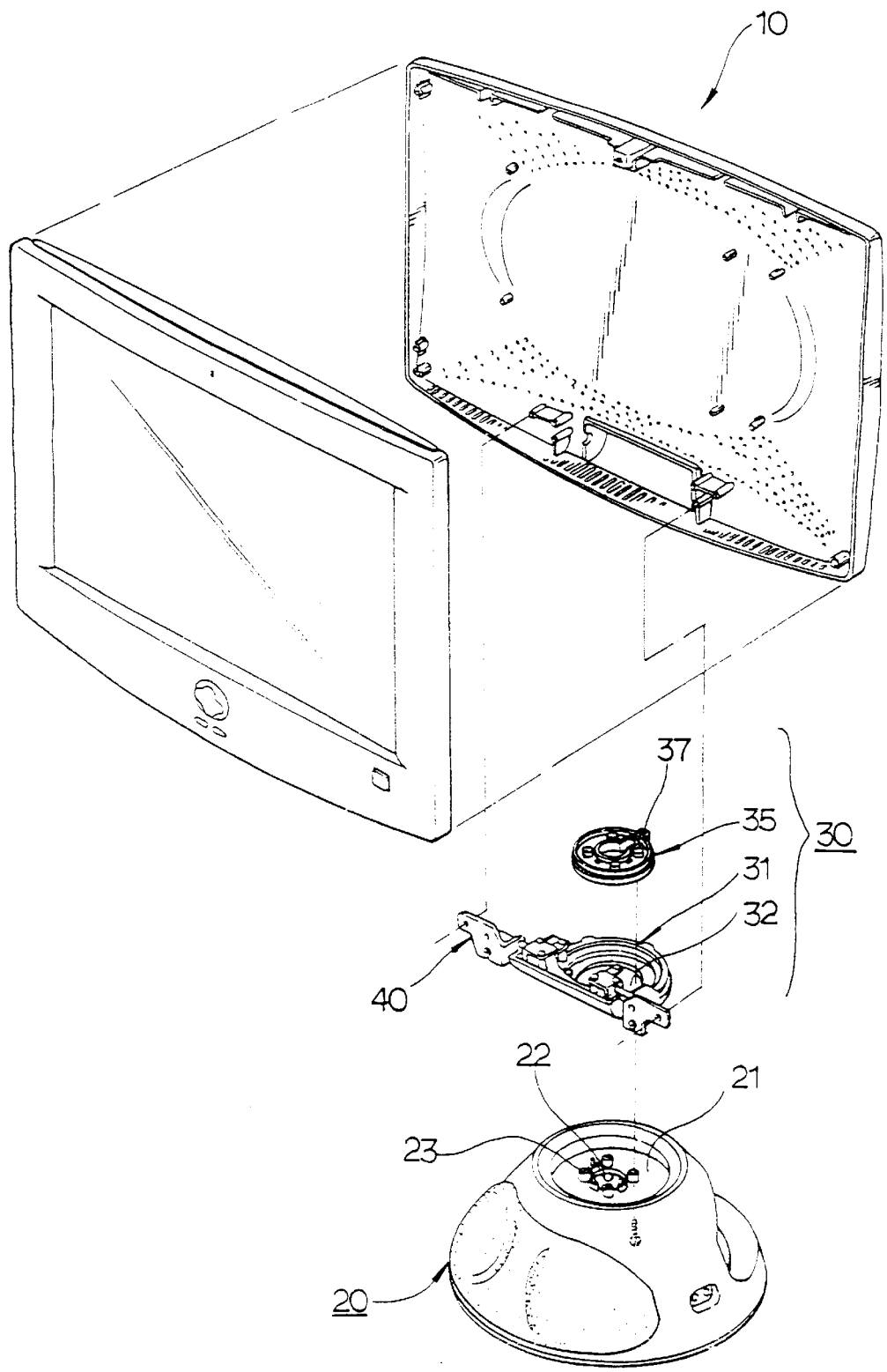
FIG. 2 is an exploded perspective view of a flat panel display device according to an embodiment of the present invention.
Figure 3:
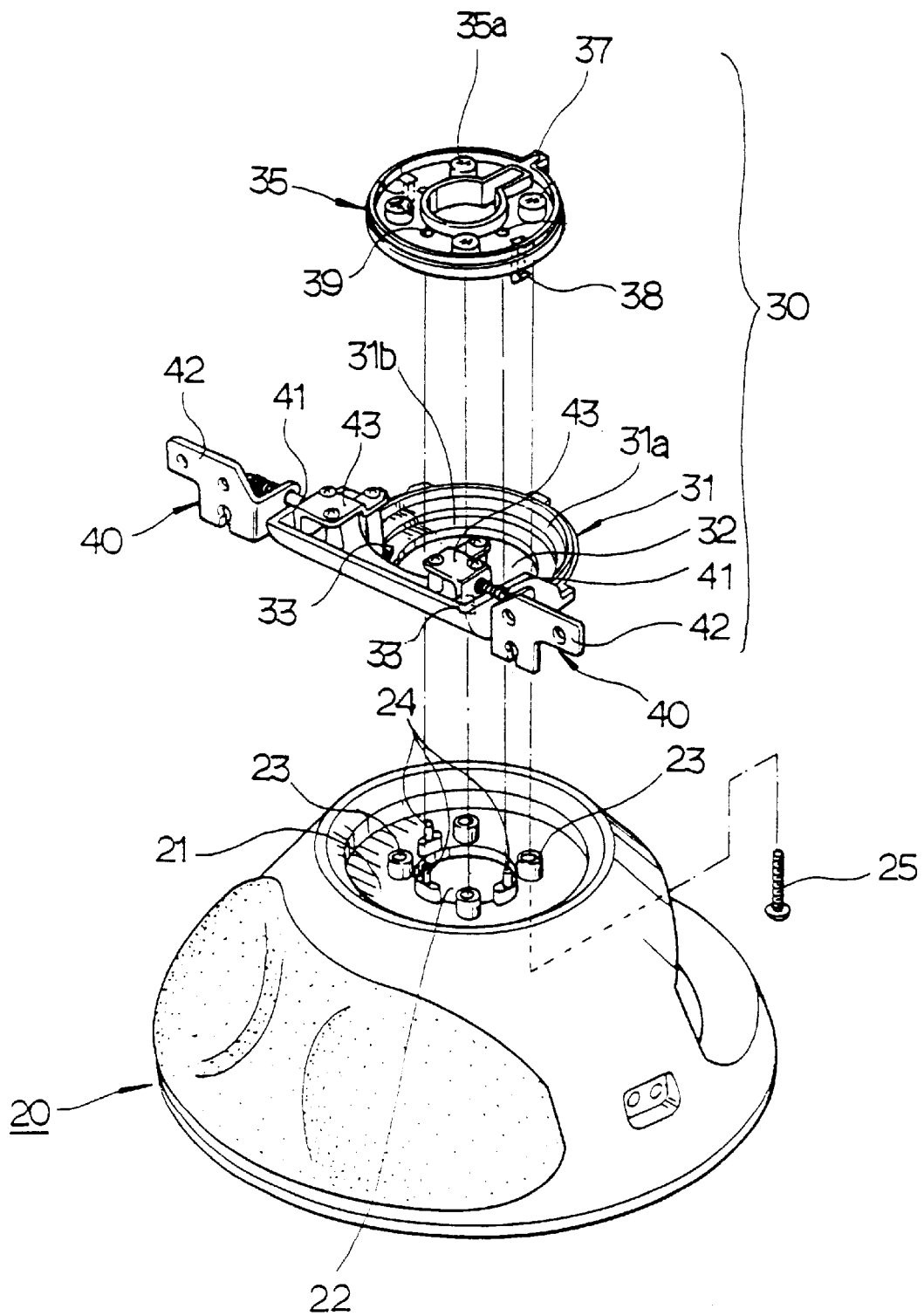
FIG. 3 is an exploded perspective view of a hinge member and a stand when a display unit is connected to the hinge member in the flat panel display device according to the embodiment of the present invention.

As shown in FIGS. 2 and 3, a flat panel display device of the present invention includes a display unit 10, a stand 20 for supporting the display unit 10, and a hinge member 30 secured to the display unit 10 and rotatably mounted to the stand 20 to adjust a visual angle of the display unit 10.

A circular recess 21 is formed at a top portion of the stand 20, with an opening 22 located at a center of the circular recess 21, and a plurality of cylindrical bodies 23 arranged at regular intervals around the opening 22. The stand 20 also includes two or more pins 24, with each of the pins 24 being positioned between the cylindrical bodies 23. A single cable (not shown) for transmitting image signals to the display unit 10 is connected to the display unit 10 and passes through the opening 22 of the stand 20. A thruhole is located at a central portion of each of the cylindrical bodies 23 through which a fastener 25, such as a bolt for example, is inserted.

Figure 6:
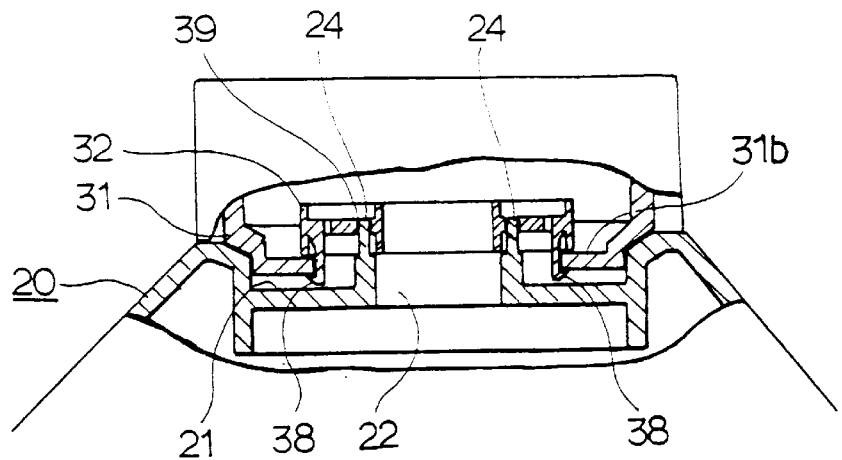
FIG. 6 is a sectional view of the hinge member and the stand of the flat panel display device according to the embodiment of the present invention, taken along section lines VI–VI' of FIG. 5.

As shown in FIGS. 3 and 6, the hinge member 30 includes a ring-shaped rotation member 31 that is rotatably mounted to the circular recess 21 of the stand 20. In addition, a holder 35 is secured to the circular recess 21 of the stand 20 to hold the rotation member 31 to the stand 20. The holder 35 includes a pair of claws 38, a plurality of bosses 35a, and two or more holes 39. The hinge member 30 also includes a rotation bracket assembly 40 that is fixed to the display unit 10 and is pivoted about tilting shafts 41, extending transversely in opposite directions about one axis, fixed to the rotation member 31.

The rotation member 31 includes a first portion 31a, and a second portion 31b, with the second portion 31b positioned below the first portion 31a. The second portion 31b has an inner diameter that is less than an inner diameter of the first portion 31a. A pair of stoppers 33 are provided along the second portion 31b and protrude upward and beyond the first portion 31a, and an angle between the stoppers 33 is approximately equal to 240°. An opening 32 is formed in the center of the second portion 31b.

Figure 4:
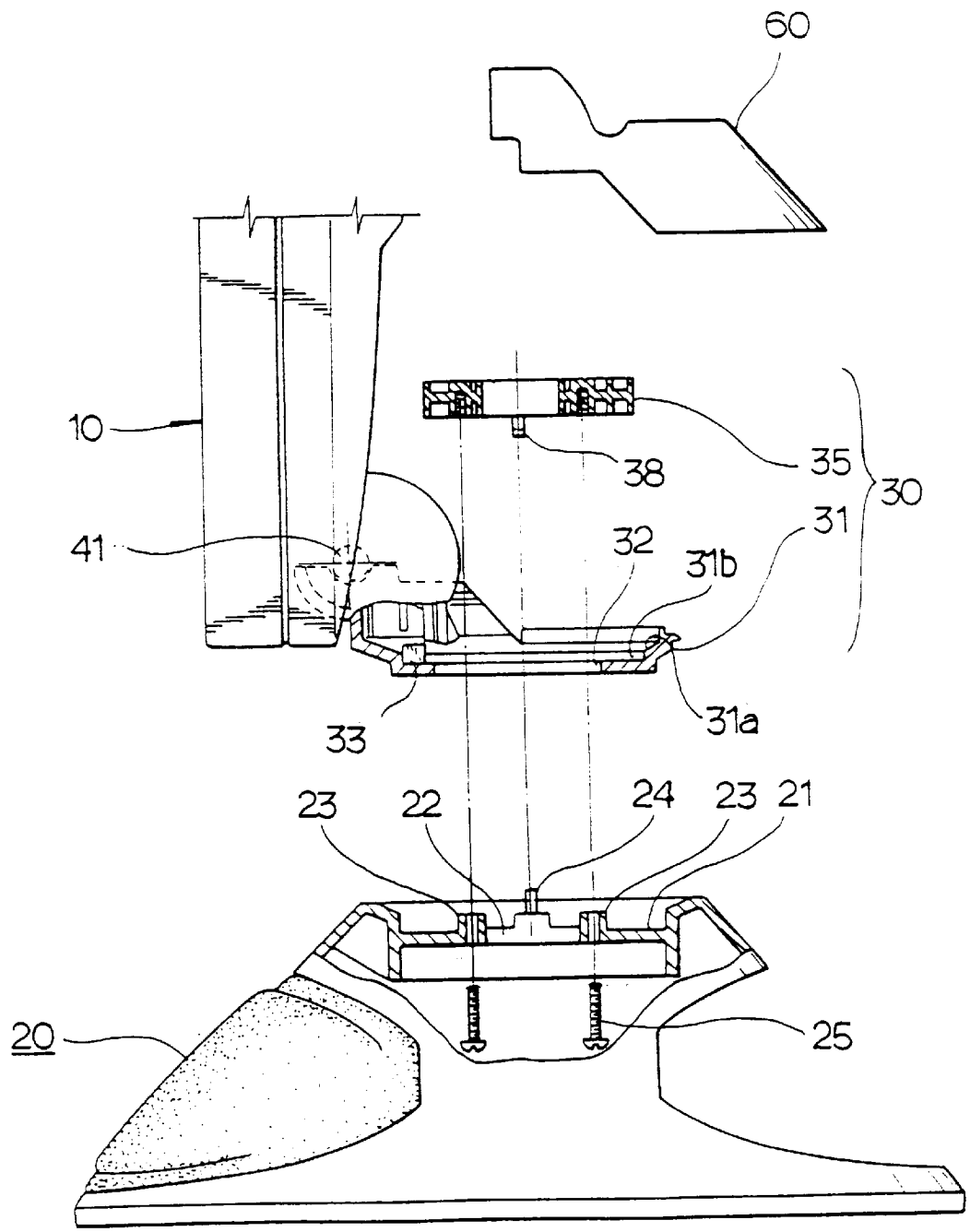
FIG. 4 is an exploded side view of the hinge member rotatably connected to the stand according to the embodiment of the present invention.

The rotation bracket assembly 40 includes a pair of bracket pieces 42 that are pivotally positioned at respective one ends of the tilting shafts 41, and the tilting shafts 41 are secured to the rotation member 31 through a pair of connecting pieces 43. As shown in FIGS. 3 and 4, the pair of bracket pieces 42 are connected to the display unit 10 by fasteners, such as screws for example. As a result, since the bracket pieces 42 are pivotally supported by respective both ends of the tilting shafts 41, the display unit 10, to which the bracket pieces 42 are fixed, can be pivoted around the tilting shafts 41.

A protrusion 37 is formed at an outer circumference of the holder 35 and comes in contact with the stoppers 33 to define a rotating range of the stoppers 33 when the rotation member 31 is rotated in the circular recess 21 of the stand 20. The claws 38 of the holder 35 are parallel to each other and are formed along a lower surface of the holder 35 to extend towards the rotation member 31. The claws 38 are passed through the opening 32 of the rotation member 31 when the holder 35 is assembled in the circular recess 21 of the stand 20. The bosses 35a are also formed along a lower surface of the holder 35 corresponding to the cylindrical bodies 23; the pins 24, located in the circular recess 21 of the stand 20, are inserted in at least two of the holes 39.

When the rotation member 31 is positioned within the circular recess 21 of the stand 20 and assembled thereto, the cylindrical bodies 23 and the pins 24 formed at the circular recess 21 are located within the opening 32 of the rotation member 31. It is advantageous to minimize an area in which the rotation member 31 makes contact with the circular recess 21 when the rotation member 31 is positioned within the circular recess 21, in order to minimize friction between the circular recess 21 and the rotation member 31. After the rotation member 31 is positioned within the circular recess 21, the holder 35 is assembled to the rotation member 31, the pins 24 on the circular recess 21 are inserted into the holes 39, and the claws 38 are passed through and are positioned under the opening 32 of the rotation member 31.

Figure 5:
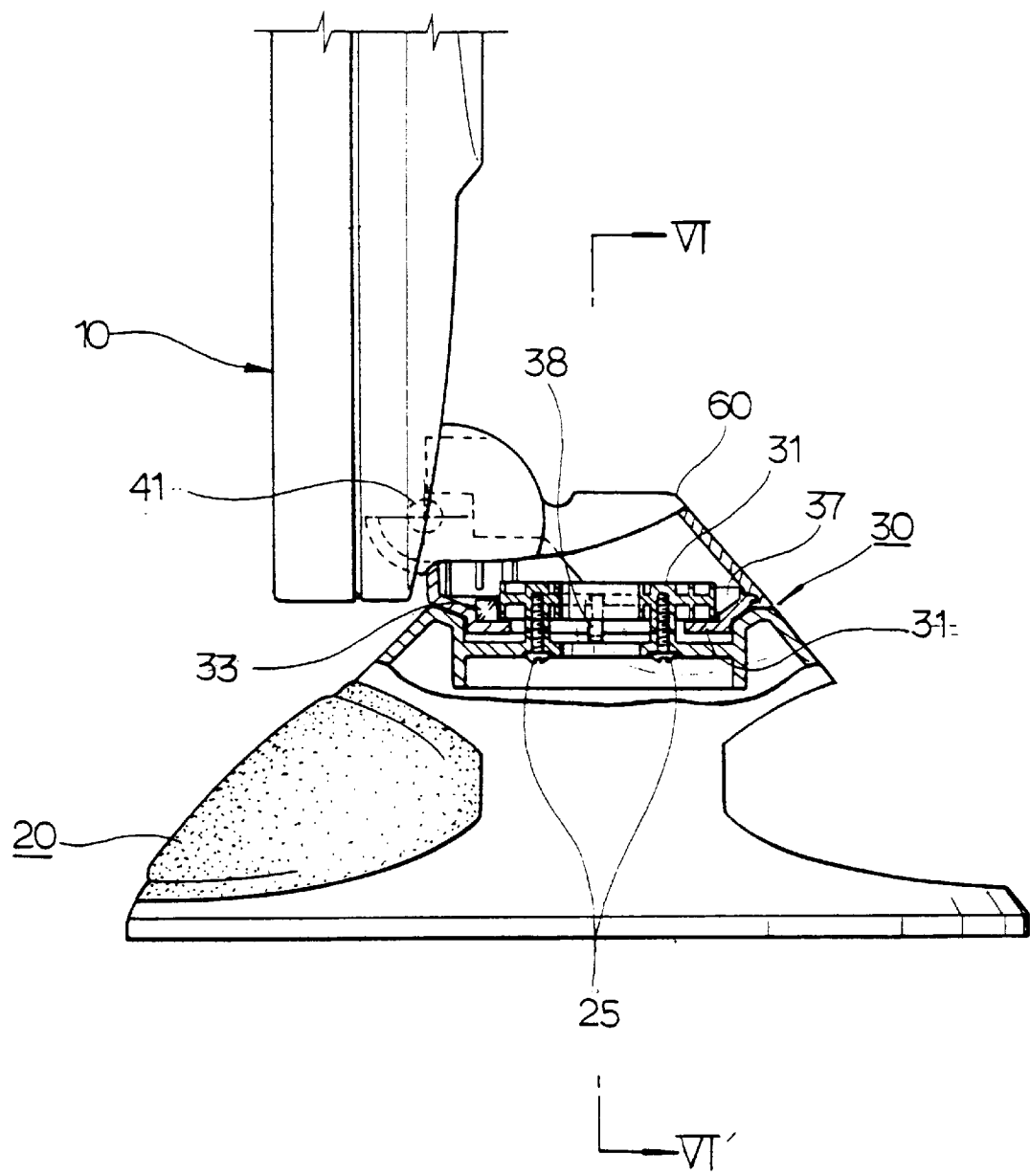
FIG. 5 is a side view of the hinge member and the stand of the flat panel display device according to the present invention.

As shown in FIGS. 3, 5, and 6, the claws 38 of the holder 35 have outward extending edges. As shown in FIG. 6, a distance between the outward extending edges of the claws 38 is greater than an inner diameter of the opening 32 of the rotation member 31. As a result, the claws 38 are engaged with a bottom surface of the rotation member 31 and prevent the holder 35 from being separated from the rotation member 31. Furthermore, when the holder 35 is assembled to the rotation member 31, a gap is formed between the rotation member 31 and the holder 35. In this way, when the rotation member 31 is rotated to adjust a visual angle of the display unit 10, the rotation member 31 does not come in contact with the holder 35, as a result of the gap formed therebetween, resulting in a smoother adjustment of the display unit 10.

When the holder 35 is assembled to the rotation member 31, the bosses 35a of the holder 35 are accurately mated with the cylindrical bodies 23 provided at the circular recess 21 of the stand 20 through the opening 32 of the rotation member 31, since the pins 24 on the circular recess 21 have been inserted into the holes 39, as above described.

Figure 7:
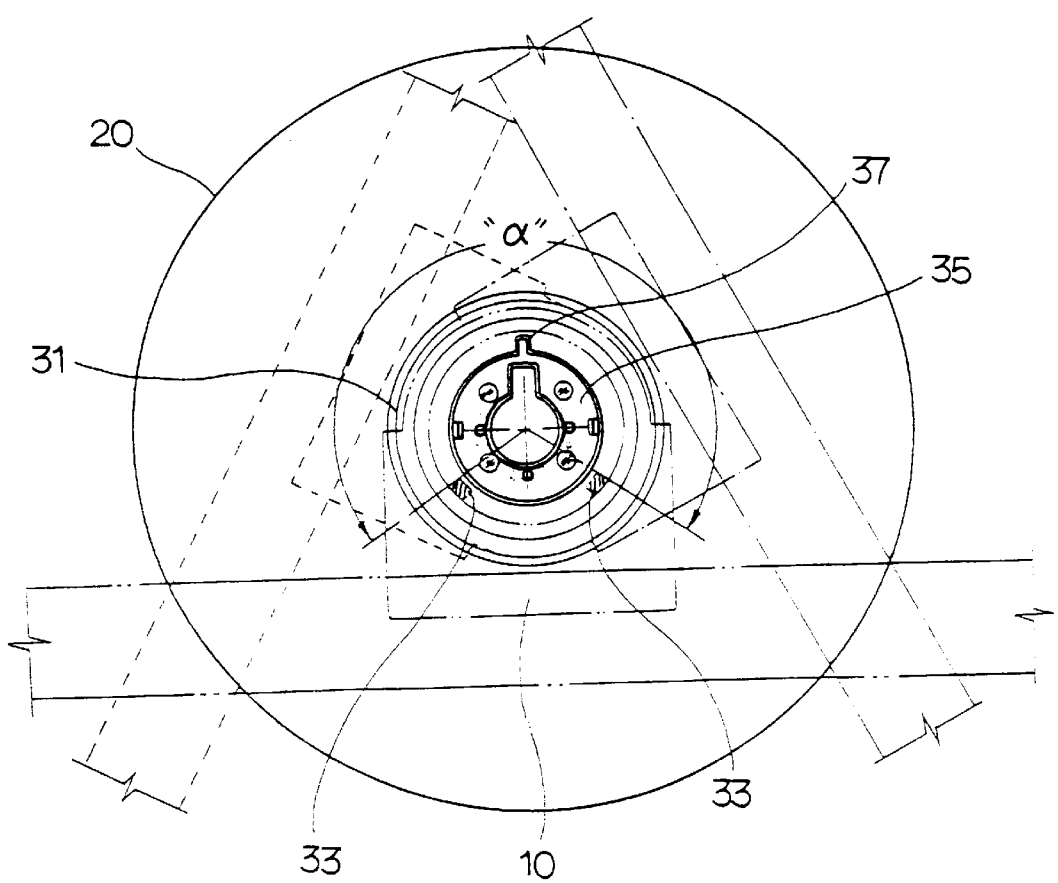
FIG. 7 top plan view of a swiveling angle of the flat panel display device according to an embodiment of the present invention.

In addition, when the holder 35 is assembled to the rotation member 31, the stoppers 33 are positioned adjacent to an outer circumference of the holder 35, so that when the rotation member 31 is rotated to adjust the visual angle of the display unit 10, the stoppers 33, which protrude upwardly beyond the first portion 31a, are stopped by the protrusion 37 of the holder 35. As shown in FIG. 7, the rotation member 31 can be rotated at an angle α, which is in a range of approximately 240° when one of the stoppers 33 is stopped by the protrusion 37, since the angle between the stoppers 33 is approximately 240°, as above described.

After the holder 35 is assembled to the rotation member 31, the fasteners 25, or bolts, are inserted through the cylindrical bodies 23 from the bottom of the circular recess 21, and are fastened to the bosses 35a of the holder 35 that are mated with the cylindrical bodies 23, as shown in FIG. 4. Since the holder 35 is positioned on the second portion 31b of the rotation member 31, as described above, it is important to properly adjust the fastening extent of the fasteners 25 to prevent the holder 35 from being in strong contact with the second portion 31b.

As a result, when the rotation member 31 is rotated to adjust the visual angle of the display unit 10, the rotation member 31 is not in contact with the lower surface of the holder 35, so that the rotation member 31 can operate smoothly within the circular recess 21 of the stand 20.

When the rotation member 31 of the hinge member 30 is assembled to the circular recess 21, the rotation bracket assembly 40 is fixed to the display unit 10 using the bracket pieces 42, the holder 35 is installed to the stand 20 to hold the rotation member 31 in place, and a cover 60 is engaged with the hinge member 30 to cover the hinge member 30 from the outside.

While the angle between the stoppers 33 is described above as being approximately equal to 240°, it is understood that the present invention is not limited to having an angle of 240° between the stoppers 33, but may include any angle required to accomplish a necessary swiveling angle of the display unit.

As described above, in the flat panel display unit according to the present invention, the display unit can be easily and smoothly rotated to adjust the visual angle of the display unit. In other words, the visual angle of the display unit can be easily adjusted since the parts used in the rotation of the display unit are not in contact, thereby reducing friction therebetween.

In addition, the visual angle of the display unit can be easily adjusted since the flat panel display unit according to the present invention has a visual angle that is wider than a visual angle of the conventional flat panel display device, as above described.

Although a preferred embodiment of the present invention has been shown and described, it will be appreciated by those skilled in the art that changes may be made in the embodiment without departing from the principles and spirit of the invention, the scope of which is defined in the claims and their equivalents.

What is claimed is:

1. A flat panel display device comprising:
   a display unit having a flat panel to display an image;
   a stand, having a circular recess, to support said display unit;
   a hinge member, including a ring-shaped rotation member having a bottom surface, rotatably secured within the circular recess of said stand, the rotation member having a first portion and a second portion, the second portion positioned below the first portion and having two stoppers and an inner diameter that is less than an inner diameter of the first portion; and
   a holder, fixed to the circular recess of said stand to secure the rotation member within said stand, having a protrusion member, formed along an outer circumference thereof to come in contact with the stoppers, and downward extending claws engaged with the bottom surface of the rotation member.

2. The flat panel display device as claimed in claim 1, further comprising a pair of tilting shafts fixed to the rotation member, wherein said hinge member includes a rotation bracket assembly fixed to said display unit and pivots about the tilting shafts.

3. The flat panel display device as claimed in claim 2, wherein the rotation bracket assembly includes:
   bracket pieces pivotably positioned at respective one ends of the tilting shafts, and
   a pair of connecting pieces respectfully fixing the tiling shafts to the rotation member.

4. The flat panel display device as claimed in claim 3, further comprising a cover to cover the hinge member.

5. The flat panel display device as claimed in claim 1, wherein the circular recess of said stand has a plurality of thruholes positioned within the inner diameter of the second portion of the rotation member, and the holder has a plurality of bosses formed at a lower surface thereof corresponding to the thruholes.

6. The flat panel display device as claimed in claim 5, wherein the holder has holes formed at the lower surface, and the circular recess of said stand includes at least two pins, the pins being positioned between the thruholes to function as a reference position to fix the holder to said stand, and wherein the pins are inserted within the holes of the holder.

7. The flat panel display device as claimed in claim 1, wherein the stoppers are positioned along a front portion of the rotation member, and the protrusion member of the holder is positioned along a rear portion of the rotation member when the holder is engaged with the rotation member.

8. The flat panel display device as claimed in claim 7, wherein an angle between the stoppers is approximately equal to 240°.

9. The flat panel display device as claimed in claim 1, wherein an angle between the stoppers is approximately equal to 240°.

10. The flat panel display device as claimed in claim 1, wherein the rotation member has a first opening and the circular recess of the stand has a second opening, with a plurality of cylindrical bodies positioned at regular intervals around the second opening, and two pins, each pin being positioned between two of the plurality of cylindrical bodies, wherein the plurality of cylindrical bodies and the pins are positioned within the first opening of the rotation member to reduce friction between the circular recess and the rotation member.

11. The flat panel display device as claimed in claim 10, wherein the holder has a plurality of bosses and holes formed along a lower surface thereof, and wherein the pins are inserted within the holes and the plurality of bosses are mated with the plurality of cylindrical bodies through the opening of the rotation member.

12. The flat panel display device as claimed in claim 11, further comprising fasteners inserted through the plurality of cylindrical bodies from a bottom portion of the circular recess and fastened to the bosses of the holder that are mated with the cylindrical bodies so that the rotation member is not in contact with the holder as the rotation member is rotated within the circular recess of the stand.

13. A display device, comprising:
   a display unit having a flat panel to display an image;
   a stand to support the display unit;
   a rotation member to adjust the display unit, rotatably secured within the stand and having an opening and two stoppers, the stoppers being positioned along an inner front portion of the rotation member; and
   a holder having a protrusion member extending outward from an outer circumference of a rear portion of the holder, and claws that pass through and are positioned under the opening of the rotation member to form a gap between the rotation member and the holder, wherein the stoppers come in contact with the protrusion member during rotation of the rotation member to define a rotating range of the rotation member.

14. The display device as claimed in claim 13, wherein the rotation member includes a first portion and a second portion, the second portion positioned below the first portion and having an inner diameter that is less than an inner diameter of the first portion, and wherein the stoppers are positioned along the second portion and protrude upward and beyond the first portion.

15. The display device as claimed in claim 13, wherein the holder includes a lower surface and the rotation member is not in contact with the lower surface of the holder during rotation of the rotation member.

16. The display device as claimed in claim 13, wherein the rotating range is approximately equal to 240°.

17. The display device as claimed in claim 13, further comprising:
   a pair of tilting shafts fixed to the rotation member;
   a rotation bracket assembly, fixed to the display unit, that pivots about the tilting shafts and includes bracket pieces pivotably positioned at respective one ends of the tilting shafts; and
   a pair of connecting pieces respectively fixing the tilting shafts to the rotation bracket assembly.

18. The display device as claimed in claim 13, wherein the stand has a circular recess and the rotation member is rotatably positioned within the circular recess, and the holder is fixed to the circular recess to secure the rotation member within the stand.

19. The display device as claimed in claim 18, wherein the rotation member has a first opening and the circular recess of the stand has a second opening, with a plurality of cylindrical bodies positioned at regular intervals around the second opening, and two pins, each pin being positioned between two of the plurality of cylindrical bodies, wherein the plurality of cylindrical bodies and the pins are positioned within the first opening of the rotation member to reduce friction between the circular recess and the rotation member.

20. The display device as claimed in claim 19, further comprising fasteners, wherein the holder has a plurality of bosses and holes formed along a lower surface thereof, the pins are inserted within the holes, and the plurality of bosses are mated with the plurality of cylindrical bodies through the opening of the rotation member, and the fasteners are inserted through the plurality of cylindrical bodies from a bottom portion of the circular recess and fastened to the bosses of the holder that are mated with the cylindrical bodies so that the rotation member is not in contact with the holder as it is rotated within the circular recess of the stand.

* * * * *

UNITED STATES PATENT AND TRADEMARK OFFICE
CERTIFICATE OF CORRECTION

PATENT NO. : 6,050,535

DATED : April 18, 2000

INVENTOR(S) : Suk-Jo Kang

It is certified that error appears in the above-identified patent and that said Letters Patent is hereby corrected as shown below:

Title Page, section [75] Inventor: "Suk-io Kang" should be --Suk-jo Kang--.

Signed and Sealed this

Twenty-second Day of May, 2001

*Attest:*

NICHOLAS P. GODICI

*Attesting Officer*     *Acting Director of the United States Patent and Trademark Office*